Dec. 9, 1930.  F. SCHIEBUHR  1,784,545
DRIVE FOR PAPER MACHINES
Filed Feb. 14, 1929
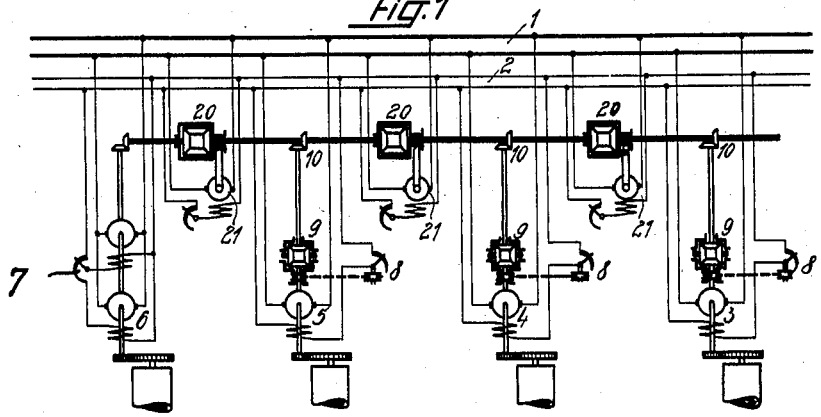
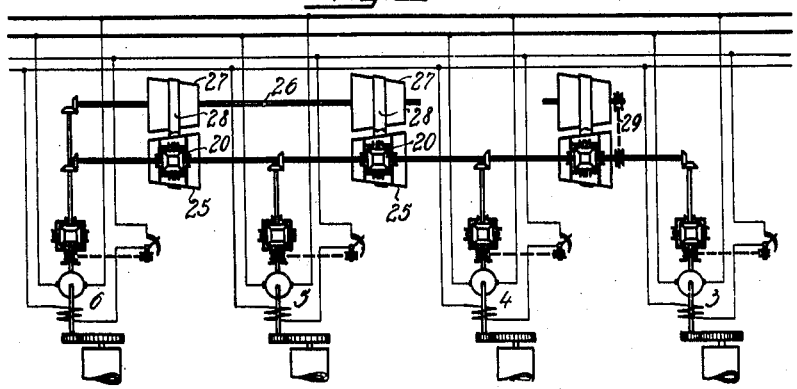
Inventor
Friedrich Schiebuhr
by Knight Bro.
attorneys Patented Dec. 9, 1930

1,784,545

UNITED STATES PATENT OFFICE

FRIEDRICH SCHIEBUHR, OF BERLIN-CHARLOTTENBURG, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

DRIVE FOR PAPER MACHINES

Application filed February 14, 1929, Serial No. 339,818, and in Germany February 10, 1928.

My invention relates to improvements in machines the individual sections of which are driven by separate electric motors, in which the section driving motors are required to cooperate in fixed adjustable speed relationship and in which the adjusted speed relationship must be maintained with great accuracy. Such drives are employed in paper making machines, for instance, in which each section of the machine is driven by a separate motor, such as a direct current motor. The armatures of these various direct current motors are then fed from a direct current supply, the voltage of which is preferably adjustable within certain limits. The field windings of the various motors are preferably fed from another direct current supply the voltage of which is as constant as possible. In the field circuit of these motors is connected an adjustable resistance, the value of which is determined by a differential gearing, one side of which is driven by the motor to be controlled, while the other side is driven in a manner more fully described herein by a "master", leading or main motor common to all the motors. The master motor may be a separate auxiliary motor or one of the section driving motors of the paper making machine or the like.

As differential regulating gearing in the meaning of my invention are to be understood such devices, which become operative when a departure occurs in the true relative angular position of the shafts driving the two members or sides of the differential gearing.

In such drives, particularly the drives of paper making machines it is necessary during the operation of the machine to change the speeds of all the motors following any motor in the working process in relation to the preceding motors in the working process.

My invention renders it possible to effect this change of the speeds of a plurality of motors in relation to those preceding in the working process by a single operation. I attain this object by coupling with the master value one side or member of a differential gearing the other side or member of which is coupled with the respective shaft of the section driving motor, and the casing of which is rotated with an adjustable speed. The shaft coordinated to the section driving motor is furthermore connected with a further differential gearing forming part of the next following section driving motor, the other side or member of which is coupled with the shaft coordinated to the next following section motor, the casing, housing or disc of the differential gearing being rotatable at an adjustable speed. The shafts of the various section driving motors are furthermore connected, for instance by a bevel gear with one side of a differential gearing, the other side of which is driven by the section motor to be controlled, the rotation of the casing of the differential gearing determining the value of the resistance connected in the field circuit of the respective motor. A similar provision is made for all the other section driving motors.

My invention will be better understood from the following description in conjunction with the accompanying drawings.

In the drawings

Fig. 1 diagrammatically shows a paper making machine drive in which a plurality of mechanical differential gearings are employed, and Fig. 2, a modification of a drive of the same type.

Referring to Fig. 1 of the drawings, 1 is a direct current supply of any desired adjustable voltage and 2 a direct current supply of substantially constant voltage. To the supply 1 are connected the armatures of the section driving motors 3, 4, 5 and 6 of the paper machine, the last mentioned motor 6 serving as master motor. The field windings of the motors 3, 4, 5 and 6 are connected through adjustable rheostats to the supply of constant voltage 2. The rheostat 7 of the master motor 6 is adjustable by hand. The rheostats of the section motors 3, 4 and 5 are each automatically adjusted by a differential gearing 9. Each of the motors 3, 4, 5 and 6 to be controlled drives through a back-gearing a shaft of the paper machine and also one side or member of a differential gearing 9 coordinated to it. The other side or member of each differential gearing is driven through a bevel gear 10 from a section of the master shaft divided into a plurality of parts. The rotatable casing which carries the planet wheels of the mechanical differential gearing controls the value of the regulating rheostat 8 belonging to the respective section driving motor.

For the purpose of uniformity, and in order to cover mechanical differential drives as well as electrical ones to be described hereinafter, I shall term the two members of the drive, corresponding to the sun-wheels of a mechanical drive, the "primary members," and the element which runs at the differential speed of the primary members the "differential member" of the drive.

According to my invention differential gearings 20 are inserted between the individual sections of the master shaft, which gearings are substantially of the same construction as the differential gearings 9 of the various motors. In these differential gearings 20 a regulable speed supplied from outside by a field-regulable direct current auxiliary machine 21 is added to or subtracted from the speed of the preceding master shaft section. In this way the result is obtained that the speed of each shaft section differs from the preceding section by an amount determined by the speed of the auxiliary machine 21, and it will be understood that the speed of the following shaft section may either be higher or lower than that of the preceding shaft section according to the direction of rotation of the auxiliary machine. By altering the speed of the auxiliary machine it is thus possible to adjust the speed relationship between each section motor and the preceding motor. In order that this speed relation may also be maintained in case of voltage fluctuations in the mains supplying the section driving motors, the armatures of the auxiliary motors 21 are preferably likewise fed from the mains 1 and their field from the mains 2 with substantially constant voltage.

Generally the arrangement will be such, that if the second shaft section runs faster than the first section by the amount determined by the auxiliary machine, the third shaft section runs slower than the second, the fourth again faster than the third and so on alternately. In this way the result is obtained that the speeds of the individual sections do not differ from each other excessively.

It is also possible to impress the additional speeds upon the differential gearings between the sections of the master shaft by means of adjustable transmission gears from a shaft common to all the section motors. Such an arrangement is illustrated in Fig. 2 of the drawings. Here the differential gearings 20 inserted between the individual sections of the master shaft are each housed in a cone pulley 25 which is fixed to the differential member of the drive, and which in conjunction with a second cone pulley 27 on a shaft 26 common to all the section motors and an endless belt 28 passing around both pulleys forms an adjustable transmission gear. Here the added or subtracted speed of each section of the master shaft in relation to the preceding one is determined by the speed of the master shaft and by the adjustable ratio of transmission of the cone pulley drive. Instead of being derived from a shaft common to all section motors, the added or deducted speed of the casing of the differential gearing may also be derived from one of the shafts connected to the primary members of the differential gearing. Such an arrangement is shown diagrammatically in Fig. 2 of the drawings for the section motor 3. The arrangement is substantially like that for the section driving motors 4 and 5, the only difference being that the second cone pulley is not mounted on a shaft common to all the section motors, but each second cone pulley is mounted on a separate piece of shafting, which by a suitable transmission element, for instance a belt 29, is driven from one of the sections of the master shaft.

Various modifications and changes may be made without departing from the spirit and the scope of the invention.

I claim as my invention:

1. In a paper machine drive, in combination, section driving motors for the paper cylinders, field regulators for said section driving motors, master shaft sections for each section driving motor, differential gearings with rotatable casings interposed between each master shaft section, regulating means for the speed of the casings of said differential gearing connected with said gearing, consisting of a separate second shaft section for each section drive, which is regulably connected with the first master shaft section belonging to the same section driving motor and which is also regulably connected with the casing of the differential gearing connecting the master shaft sections of adjacent section driving motors, differential gears interposed between the section driving motor and the respective master shaft section, and connecting means between the casing of said differential gearing connecting the section driving motor with the respective master shaft section and said field regulator controlling said section driving motor.

2. In a paper machine drive, in combination, section driving motors for the paper cylinders, field regulators for said section driving motors, a master shaft section for each section driving motor, differential drives interposed between adjacent master shaft sections, regulating means for the speed of the differential members of said differential drives connected with said drives, a differential drive interposed between each section driving motor and the respective master shaft section, and connecting means between the differential member of each sectional differential drive and the pertaining field regulator for individually controlling said section driving motors.

3. In a paper machine drive, in combination, section driving motors for the paper cylinders, field regulators for said section driving motors, a master shaft section for each section driving motor, differential drives interposed between adjacent master shaft sections, regulating means for the speed of the differential members of said differential drives consisting of a control motor connected with the differential member of each differential drive, a differential drive interposed between each section driving motor and the respective section of the master shaft, connecting means between the differential member of each of said last named differential drives and the pertaining field regulator for individually controlling said section driving motors.

4. In a paper machine drive, in combination, section driving motors for the paper cylinders successively arranged in accordance with the sequence of operations of the machine, field regulators for said section driving motors, a master shaft section for each section driving motor, differential drives connecting said master shaft sections, regulating means for the speed of the differential members of said differential drives, consisting of a single continuous second master shaft common to all section drives and being connected with the master motor and having a variable transmission gear for every section driving motor, disposed to drive the differential member of the differential drive connecting the pertaining master shaft section of each section driving motor with the preceding master shaft section, a differential drive interposed between each section driving motor and the pertaining section of the master shaft, and connecting means between the differential member of each of said drives and the pertaining field regulator controlling the section driving motor.

In testimony whereof I affix my signature.
FRIEDRICH SCHIEBUHR.